(12) United States Patent
Asokan et al.

(10) Patent No.: US 9,198,064 B2
(45) Date of Patent: Nov. 24, 2015

(54) METHODS, SYSTEMS, AND COMPUTER READABLE MEDIA FOR SIMULATING CHANNEL CONDITIONS

(71) Applicant: Ixia, Calabasas, CA (US)

(72) Inventors: Ramanathan Asokan, Cary, NC (US); Prasada Rao Devarasetty, Cary, NC (US); Madhu H. Rangappagowda, Cary, NC (US)

(73) Assignee: IXIA, Calabasas, CA (US)

( * ) Notice: Subject to any disclaimer, the term of this patent is extended or adjusted under 35 U.S.C. 154(b) by 291 days.

(21) Appl. No.: 13/682,670

(22) Filed: Nov. 20, 2012

(65) Prior Publication Data

US 2014/0086075 A1 Mar. 27, 2014

Related U.S. Application Data

(60) Provisional application No. 61/703,970, filed on Sep. 21, 2012.

(51) Int. Cl.
*H04W 24/06* (2009.01)

(52) U.S. Cl.
CPC .................................... *H04W 24/06* (2013.01)

(58) Field of Classification Search
CPC ...................................................... H04W 24/06
See application file for complete search history.

(56) References Cited

U.S. PATENT DOCUMENTS

2011/0310745 A1* 12/2011 Goria et al. ................... 370/241

OTHER PUBLICATIONS

Ikuno et al., "System level simulation of LTE networks," 2010 IEEE 71st Vehicular Technology Conference, pp. 1-5 (May 16-19, 2010).*

* cited by examiner

*Primary Examiner* — Huy D Vu
*Assistant Examiner* — Teisha D Hall
(74) *Attorney, Agent, or Firm* — Jenkins, Wilson, Taylor & Hunt, P.A.

(57) ABSTRACT

Methods, systems, and computer readable media for simulating channel conditions are disclosed. According to one method, the method includes storing a plurality of system level metrics associated with various channel conditions. The method also includes receiving data from a device under test (DUT). The method further includes for each of a plurality of user devices or simulated user devices during a test period: identifying, using information about the received data and a precomputed channel type configuration, a first system level metric from the plurality of system level metrics, and providing the first system level metric to the DUT.

27 Claims, 6 Drawing Sheets

| Name | SINR -5 db | SINR 0 db | SINR 5 db | SINR 10 db | SINR 15 db | SINR 20 db | SINR 25 db | SINR 30 db |
|---|---|---|---|---|---|---|---|---|
| MCS 0 | 3 | 1 | 0.4 | 0.3 | 0.3 | 0.3 | 0.3 | 0.2 |
| MCS 1 | 7 | 1 | 0.4 | 0.8 | 0.6 | 0.5 | 0.4 | 0.2 |
| MCS 2 | 11 | 3.5 | 0.9 | 0.8 | 0.7 | 0.6 | 0.5 | 0.2 |
| MCS 3 | 15 | 3.5 | 0.9 | 0.8 | 0.7 | 0.7 | 0.6 | 0.2 |
| MCS 4 | 19 | 3.5 | 0.9 | 0.8 | 1 | 0.8 | 0.7 | 0.2 |
| MCS 5 | 24 | 3.5 | 0.9 | 1.8 | 0.8 | 0.9 | 0.8 | 0.2 |
| MCS 6 | 29 | 4 | 1.9 | 2.8 | 1.2 | 1 | 0.8 | 0.2 |
| MCS 7 | 34 | 4 | 1.9 | 4.3 | 1.7 | 1.3 | 0.8 | 0.2 |
| MCS 8 | 39 | 5.5 | 1.9 | 4.3 | 1.8 | 1.5 | 0.8 | 0.3 |
| MCS 9 | 44 | 5.5 | 1.9 | 4.3 | 2.8 | 1.6 | 0.8 | 0.3 |
| MCS 10 | 49 | 5.5 | 1.9 | 4.8 | 3.8 | 1.8 | 1.4 | 0.3 |
| MCS 11 | 54 | 7 | 1.9 | 4.8 | 3.8 | 2.1 | 1.4 | 0.3 |
| MCS 12 | 54 | 7.5 | 3.9 | 4.8 | 3.8 | 2.3 | 1.4 | 0.3 |
| MCS 13 | 54 | 9.2 | 3.9 | 4.8 | 3.8 | 2.4 | 1.4 | 0.3 |
| MCS 14 | 54 | 9.2 | 3.9 | 4.8 | 3.8 | 2.4 | 1.4 | 0.3 |
| MCS 15 | 54 | 13.5 | 5.9 | 4.8 | 3.8 | 2.4 | 1.4 | 0.3 |
| MCS 16 | 54 | 13.5 | 5.9 | 4.8 | 3.8 | 2.4 | 1.4 | 0.3 |
| MCS 17 | 54 | 13.5 | 5.9 | 4.8 | 3.8 | 2.4 | 1.4 | 0.3 |

FIG. 4

FIG. 5

METHODS, SYSTEMS, AND COMPUTER READABLE MEDIA FOR SIMULATING CHANNEL CONDITIONS

PRIORITY CLAIM

This application claims the benefit of U.S. Provisional Patent Application Ser. No. 61/703,970, filed Sep. 21, 2012; the disclosure of which is incorporated herein by reference in its entirety.

TECHNICAL FIELD

The subject matter described herein relates to testing communications networks. More specifically, the subject matter relates to methods, systems, and computer readable media for simulating channel conditions.

BACKGROUND

Long term evolution (LTE) and other radio communications technologies can require significant infrastructure and configuration. Generally, network operators test various aspects of their network equipment to ensure reliable and efficient operation. Network operators typically simulate various conditions before equipment is deployed in a live network to decrease avoidable delays and/or other problems.

Various technical specifications, such as the 3rd Generation Partnership Project (3GPP) Technical Specifications 36.211, 36.212, 36.213, and 36.214, hereinafter respectively referred to as "TS 36.211", "TS 36.212", "TS 36.213", and "TS 36.214", define aspects of LTE communications. Generally, data from the network to a user device is referred to as downlink data and data from the user device to the network is referred to as uplink data. For example, user equipment (UE), such as a cellular mobile phone or a tablet computer, may communicate with an enhanced or evolved Node B (eNode B) via the cellular radio transmission link. Data that is sent from the eNode B to the UE is downlink data, and data that is sent from the UE to the eNode B is uplink data.

Uplink and downlink LTE data is usually transmitted using one or more multiplexing and/or modulation schemes. For example, in some LTE networks, downlink data is transmitted using an orthogonal frequency-division multiplexing (OFDM) and uplink data is transmitted using single carrier frequency-division multiple access (SC-FDMA). Such schemes may allow multiple streams of data to be sent simultaneously (e.g., at different frequencies). While such schemes may allow data to be communicated at high-speed, significant processing is required to encode and decode the data. For example, an eNode B may perform channel coding, multiplexing, and interleaving of data and control streams, which are then sent to the UE over the air (RF) interface. After pre-processing the received signal from the eNode B, the UE may perform channel delineation for downlink physical channels and/or other baseband processing. After separating LTE data from various physical layer channels, the LTE data may be further processed.

Since LTE communications are generally complex and processing is time-sensitive, it is important for baseband processing to be performed quickly and efficiently. Further complexity is added, when radio channel propagation conditions are simulated. For example, conventional methods of testing radio channel conditions involve manipulating or modifying the radio frequency signal or the baseband equivalent (e.g., the signal or data sent from the eNode B). While manipulating the baseband for testing channel conditions associated with a single UE is possible, manipulating the baseband for each of a plurality of simulated UEs present significant challenges, including being very resource-intensive. Further, performing baseband manipulation in addition to other baseband processing for each of a plurality of simulated UEs within an acceptable time frame can be very challenging.

Accordingly, in light of these difficulties, a need exists for improved methods, systems, and computer readable media for simulating radio channel conditions.

SUMMARY

Methods, systems, and computer readable media for simulating channel conditions are disclosed. According to one method, the method includes storing a plurality of system level metrics associated with various channel conditions. The method also includes receiving data from a device under test (DUT). The method further includes for each of a plurality of user devices or simulated user devices during a test period: identifying, using information about the received data and a precomputed channel type configuration, a first system level metric from the plurality of system level metrics, and providing the first system level metric to the DUT.

A system for performing LTE channel data processing is also disclosed. The system includes a memory configurable for storing a plurality of system level metrics associated with various channel conditions. The system also includes a communications interface configured to receive data from a device under test (DUT). The system also includes a channel condition simulator (CCS) module embodied in a non-transitory computer readable medium configured to, for each of the plurality of user devices or simulated user devices during a test period, identify, using information about the received data and a precomputed channel type configuration, a first system level metric from the plurality of system level metrics, and provide the first system level metric to the DUT.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

As used herein, the terms "user equipment" or "UE" refer to any computing or communication device that is capable of accessing or communicating via a mobile network

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for simulating channel conditions. When testing LTE networks and/or other wireless communications network, it may be desirable to test the response of the network and other equipment under non-trivial load conditions. For example, it may be desirable to test an eNode B by simulating multiple UEs experiencing various radio channel conditions.

In real-world applications, system level metrics are typically computed during run-time for every frame received and sent back to an eNode B. Using the system level metrics, the eNode B may adjust or modify various downlink channel properties, e.g., modulation and coding schemes (MCSs) for various channels. Advantageously, aspects of the present subject matter described herein can be used to efficiently simulate channel conditions for a plurality of simulated UEs by precomputing and storing system level metrics associated with various channel conditions. For example, precomputed system level metrics or degradation metrics (e.g., channel quality indicator (CQI) and a block error rate (BLER)) may be generated using one or more physical layer simulations and channel models. Hence, instead of manipulating a received radio signal for each simulated UE and computing degradation metrics associated with each manipulated received radio signal, a multi-UE simulator in accordance with aspects of the present subject matter described herein may use or derive relevant system level metrics (e.g., using on one or more inputs) from the precomputed system level metrics.

Additionally, aspects of the present subject matter described herein can be used to simulate channel conditions that approximate real-world feedback. For example, statistical properties may be associated with precomputed system level metrics and stored for use by a multi-UE simulator. The statistical properties may be used to modify a retrieved precomputed system level metric. For example, a retrieved precomputed system level metric may be modified by a bounded randomization function. The bounded randomization function may modify a precomputed and stored value such that the output may vary slightly from other system level metrics associated with similar or identical channel conditions. Hence, a multi-UE simulator according to the present subject matter described herein may simulate more realistic system level metrics and/or channel conditions using significantly less resources than conventional solutions.

Figure 1:
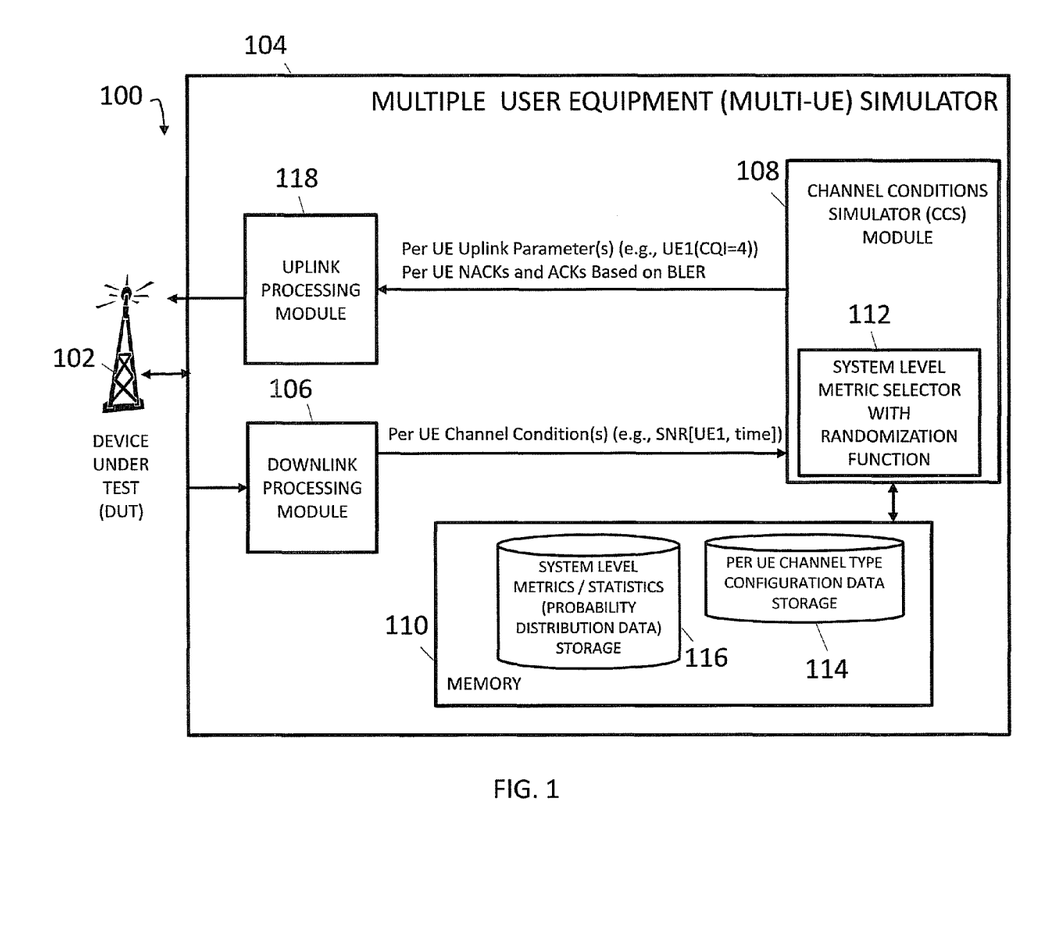
FIG. 1 is a diagram illustrating an exemplary device for simulating channel conditions according to an embodiment of the subject matter described herein.

FIG. 1 is a diagram illustrating an exemplary wireless network 100 for simulating channel conditions according to an embodiment of the subject matter described herein. Network 100 may include a device under test (DUT) 102 and a multi-UE simulator 104. DUT 102 may represent any suitable entity (e.g., a base transceiver station (BTS), node B, eNode B, etc.) for providing data via an air interface or other interface. For example, DUT 102 may be an LTE mobile network entity having functionality similar to that of a radio network controller (RNC) and a base station (BS) in 2G networks or an RNC and a Node B in 3G mobile networks. In some embodiments, DUT 102 may communicate with multi-UE simulator 104 and may be responsible for header compression, ciphering, reliable delivery of packets, admission control, and radio resource management. DUT 102 may also communicate with various other modules and/or nodes.

Multi-UE simulator 104 may be any suitable entity (e.g., a stand-alone node or distributed multi-node system) configured to simulate one or more UEs (e.g., LTE UEs), to send communications to DUT 102, to receive communications from DUT 102, and/or to test communications capabilities of DUT 102. For example, multi-UE simulator 104 may be used for simulating network load conditions and/or for analyzing performance of DUT 102 and/or network nodes under the simulated conditions. In some embodiments, multi-UE simulator 104 may be a single node or may be distributed across multiple computing platforms or nodes. Multi-UE simulator 104 may include various modules for performing one or more aspects of simulation described herein. Multi-UE simulator 104 may include an uplink processing module 118, a downlink processing module 106, a memory 110, and a channel condition simulator (CCS) module 108. It will be appreciated that modules may include various physical components. For example, each of elements 104, 106, 108, and 118 may be a field-programmable gateway array (FPGA), an application-specific integrated circuit (ASIC), or software executing on a processor.

Uplink processing module 118 may be any suitable entity (e.g., ASIC, FPGA or software executing on a processor) used in processing uplink data (e.g., simulated UE traffic data). For example, uplink processing module 118 may perform one or more aspects associated with uplink baseband processing for sending traffic towards DUT 102. Uplink processing module 118 may perform data integrity operations (e.g., generating and inserting cyclic redundancy check (CRC) values for transport data blocks or portions thereof), LTE channel data mapping or encoding, multiplexing operations, rate matching, interleaving, and/or other data processing.

Uplink processing module 118 may receive system level feedback metrics or other information from CCS module 108. Using the received information, uplink processing module 118 may generate one or more uplink frames for data receipt feedback information (e.g., data block acknowledgements (ACKs) and/or negative ACKs (NACKs)). In some embodiments, system level feedback metrics may include UE-specific uplink control parameter values, such as a CQI and a RI. For example, a CQI may be a value between 0-15 and may be used by DUT 102 for selecting an MCS or a suitable downlink transmission data rate for subsequent downlink data. A CQI may typically be correlated with an observed signal-to-interference-plus-noise ratio (SINR) at the UE and may take into account various UE capabilities, such as the number of antennas and the type of receiver used for detection. Generally, downlink scheduling and link adaptation are modified based on the CQI reported to DUT 102.

In some embodiments, data receipt feedback information may be received and/or derived from information (e.g., a BLER) received from CCS module 108. For example, CCS module 108 or uplink processing module 118 may generate NACKs and ACKs for a given UE in proportion to an associated BLER (e.g., a 6% BLER). A BLER may indicate a rate of reception errors on the radio interface. For example, a BLER may indicate the numbers of transport blocks with cyclic redundancy check (CRC) error indications out of the total number of transmitted transport blocks. The data receipt feedback information may be communicated to DUT 102.

Downlink processing module 106 may be any suitable entity (e.g., ASIC, FPGA or software executing on a processor) used in processing downlink data (e.g., eNode B traffic data and control information). For example, downlink processing module 106 may perform one or more aspects associated with downlink baseband processing for data transmitted from DUT 102. Downlink processing module 106 may perform data integrity operations (e.g., checking and removing CRC values), LTE channel data de-mapping or decoding, de-multiplexing operations, and/or other data processing.

In some embodiments, downlink processing module 106 may determine, generate, and/or derive one or more channel condition metrics and/or downlink channel properties from received data. Downlink processing module 106 may provide the one or more channel condition metrics and/or downlink channel allocation information to CCS module 108. For example, downlink processing module 106 may receive data from DUT 102. In this example, downlink processing module 106 may compute or determine a signal to noise (SNR) value and/or a MCS value associated with a downlink channel at a transmission time interval (TTI) for each of a plurality of UEs or simulated UEs. The SNR values and/or other information may be sent to CCS module 108 for further processing.

CCS module 108 may be any suitable entity (e.g., ASIC, FPGA or software executing on a processor) used in simulating channel conditions and/or for determining, selecting, and/or providing system level metrics indicative of simulated channel conditions. CCS module 108 may include a system level metric selector 112 and may access memory 110.

In some embodiments, CCS module 108 or another module may generate or precompute (e.g., prior to run-time or a test period) system level metrics. For example, CCS module 108 or another module may perform physical layer simulation processing for each simulated UE that is to be involved in a network system simulation. In this example, physical layer simulation processing may be referred to as "pre-processing" as it may be performed prior to the execution of the network system level simulation.

In some embodiments, physical layer simulation processing may include determining relationships between a system level metric (e.g., an uplink parameter, a CQI, a BLER, a pre-coding matrix indicator (PMI), a rank indicator (RI), a downlink or receive signal strength (RxLev), or a downlink or receive signal quality (RxQual)), a channel model (e.g., as an additive white Gaussian noise (AWGN) model, an extended pedestrian A (EPA) model, an extended vehicular A (EVU) model, an extended typical urban (ETU) model, an extended pedestrian A five hertz (EPA-5) model, an extended vehicular A five hertz (EVA-5) model, an extended vehicular A seventy hertz (EVA-70) model, a high-speed train (HST) model, an extended typical urban seventy hertz (ETU-70) model, an extended typical urban three hundred hertz (ETU-300) model), and/or a channel condition metric (e.g., SINR, SNR, or MCS value).

In some embodiments, physical layer simulation processing may include performing a sensitivity or perturbation analysis to determine, for a particular channel model (e.g., AWGN), probability distributions or other statistical properties for a particular system level metric (e.g., a CQI) with respect to one or more channel condition metrics (e.g., an SNR or SINR value). The computed probability distributions may be stored in a memory 110 and may be accessible to the multi-UE simulator 104. Using the computed probability distributions, further analysis and/or processing may be performed to determine, for a particular system level metric (e.g., CQI) associated with certain channel condition metrics, the mean, variance and/or standard deviation with respect to a particular channel model (e.g., AWGN).

In some embodiments, physical layer simulation processing may be performed for any possible combinations of system level metrics, channel models, and channel condition metrics. In such embodiments, information associated with physical layer simulation processing, including corresponding probability distributions or other statistical properties) may be stored and/or used by CCS module 108 and/or other modules or nodes.

System level metric selector 112 may be any suitable entity (e.g., software executing on a processor) for selecting precomputed system level metrics and related statistical properties based on one or more inputs. As used herein, the term "precomputed" may refer to data determined or computed prior to the start of a test period, prior to a system or network level simulation, or while multi-UE simulator 106 is not actively testing simulated channel conditions.

When selecting system level metrics and related statistical properties, selector 112 may use information about data received from DUT 102 (e.g., a channel condition metric and/or downlink channel allocation information) and/or a precomputed channel type configuration (e.g., a channel type or model associated with a given UE). Using this information, selector 112 may identify one or more relevant system level metrics from a plurality of stored system level metrics, e.g., in memory 110.

In some embodiments, selector 112 may include or use a bounded randomization function or other method for modifying precomputed system level metrics. The randomization function may be used to generate uplink parameter values that are similar to real-world values. For example, precomputed system level metrics stored in memory 110 may be fixed and may represent average or mean values, while real-world system level metric values may vary slightly (e.g., even when similar channel conditions are involved). To more accurately approximate real-world conditions, selector 112 may use statistical properties (e.g., a standard deviation value, probability distribution information, a maximum value, a mean value, and/or a minimum value) associated with the precomputed system level metrics to adjust or modify a precomputed system level metric. In some embodiments, uplink parameter values based on the same precomputed system level metric may be different at different times (e.g., at different TTIs) and/or for different UEs. For example, by using a randomization function, a precomputed system level metric value (e.g., BLER=8%) may be modified to one value (e.g., BLER=7.5%) at a first time and the same metric value (i.e., BLER=8%) may be modified to a second value (e.g., BLER=8.8%) at a second time.

In some embodiments, statistical properties for some system level metrics may be precomputed or generated dynamically. In some embodiments, statistical properties for some system level metrics may be based on mathematical equations and/or real-world data. In some embodiments, statistical properties and/or stored system level metrics may be modified, entered, or created by a system operator. For example, multi-UE simulator 104 may provide an interface (e.g., a graphical user interface) for entering or changing data.

Memory 110 may be any suitable entity (e.g., a non-transitory computer readable medium) for storing information. Memory 110 may include system level metrics and/or statistical properties (SLMS) storage 116 and a channel type configuration data (CTCD) storage 114. SLMS storage 116 may be any suitable entity (e.g., a database embodied or stored in a computer readable medium) for storing system level metrics and/or associated statistical properties. In some embodiments, system level metrics may be indexed by a channel type configuration (e.g., a channel model) and one or more channel condition metrics and/or downlink channel properties.

CTCD storage 114 may be any suitable entity for storing channel configuration data. For example, CTCD storage 114 may include associations between simulated UEs and channel models used by the simulated UEs. For example, CTCD storage 114 may associate channel models and simulated UEs during a test period. In this example, CTCD storage 114 may be updated prior to, during, and/or after a test period. CTCD storage 114 and/or SLMS storage 116 may be accessible by one or more modules of multi-UE simulator 104 and/or other nodes or users. In some embodiments, CTCD storage 114 and/or SLMS storage 116 may be located externally to or integrated with one or more modules.

It will be appreciated that the above described elements are for illustrative purposes and that features or portions of features described herein may be performed by different and/or additional elements, modules, components, or nodes. For example, aspects of simulating channel conditions described herein may be performed by downlink processing module 106, CCS module 108, and/or other modules. In another example, storage 116 or 114 may be located at a separate node or distributed or separated across multiple nodes.

Figure 2A:
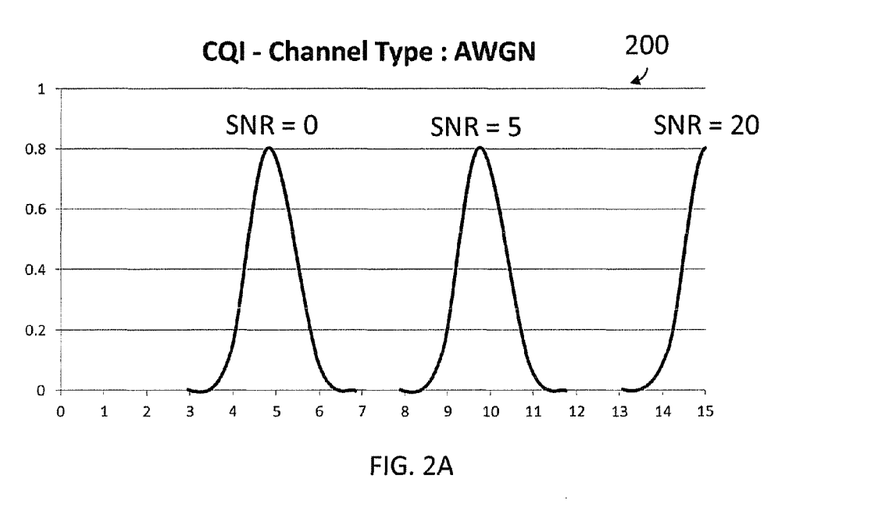
FIGS. 2A-2B are diagrams illustrating exemplary probability distributions for a system level metric according to an embodiment of the subject matter described herein.
Figure 2B:
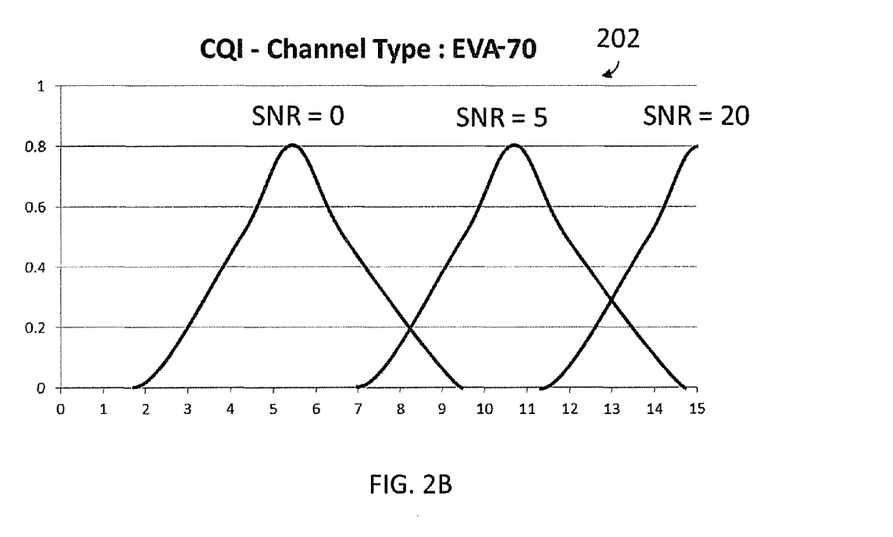

FIGS. 2A-2B are diagrams illustrating exemplary probability distributions for a system level metric according to an embodiment of the subject matter described herein. In some embodiments, probability distributions for system level metrics may be stored in memory 110 and may be usable by CCS module 108 and/or selector 112. In some embodiments, probability distributions may be precomputed or dynamically generated based on various data, including user inputted information, historical values, channel models, and/or statistical predictions. In some embodiments, probability distributions may indicate a likelihood of a value for a particular system level metric occurring in a real-world or actual environment based on one or more UE channel condition metrics (e.g., an SNR value or an SINR value) and a channel type configuration (e.g., a channel model). For example, for a given channel model, probability distributions associated with a CQI may indicate that a value of 5 has an 80% probability of occurring, a value of 4 has a 10% probability of occurring, and a value of 6 has a 10% probability of occurring.

In FIGS. 2A-2B, exemplary charts 200 and 202 depict probability distributions (y axis) for a CQI value (x axis). Exemplary chart 200 includes SNR values and related probability distributions associated with an AWGN channel model. Exemplary chart 200 includes probability three distribution lines, where the highest point on each line indicates a value having the highest probability of occurring in a real-life or actual environment when an SINR value indicated is detected. For example, an SINR value of 0 may correlate to a CQI value between 3 and 7, where the value having the highest probability of occurring is 5. In another example, an SNR value of 5 may correlate to a CQI value between 8 and 12, where the value having the highest probability of occurring is 10. In yet another example, an SNR value of 20 may correlate to a CQI value between 13 and 15, where the value having the highest probability of occurring is 15.

Exemplary chart 202 includes SNR values and related probability distributions associated with an EVA-70 channel model. Exemplary chart 202 includes three probability distribution lines, where the highest point on each line indicates a value having the highest probability of occurring in a real-life or actual environment when an SINR value indicated is detected. For example, an SINR value of 0 may correlate to a CQI value between 2 and 10, where the value having the highest probability of occurring is 5. In another example, an SNR value of 5 may correlate to a CQI value between 7 and 15, where the value having the highest probability of occurring is 11. In yet another example, an SNR value of 20 may correlate to a CQI value between 11 and 15, where the value having the highest probability of occurring is 15.

In some embodiments, probability distributions for a system level metric (e.g., CQI) may vary depending on one or more factors, such as channel configuration type (e.g., channel model). For example, as shown in charts 200 and 202, probability distributions associated with an AGWN channel model include fewer possible values than probability distributions associated with an EVA-70 channel model.

In some embodiments, probability distribution information may be stored in memory 110, such as SLMS storage 116, and may include associations between probability values (e.g., values between 0.0 and 1.0) and one or more index values. For example, index values may include one or more channel condition metrics or downlink channel properties (e.g., an SNR, SINR, or MCS value) and/or a channel type configuration (e.g., an AGWN channel model).

In some embodiments, probability distribution information may include one or more standard deviations or other statistical characterization information. In such embodiments, selector 112 may use a standard deviation, a predetermined system level metric (e.g., a mean value), and a mathematical algorithm to simulate a realistic system level metric.

It will be appreciated that charts 200 and 202 are for illustrative purposes and that probability distributions for additional and/or different system level metrics and/or channel type configurations may be stored and used by various aspects of the subject matter described herein.

FIGS. 3A-3F are diagrams illustrating time variance associated with a system level metric according to an embodiment of the subject matter described herein. In some embodiments, selector 112 or another module may determine a number of NACKs and/or ACKs to send for a given UE during a given period based on a system level metric, such as a BLER. A given period for measuring or expressing BLER (e.g., a BLER period) may vary for different UEs and may be based on a related channel model.

In some embodiments, a BLER period may be derived from a coherence time associated with a maximum Doppler frequency of a channel model. That is, a coherence time for a channel model may be a function of multiplicative inverse or reciprocal of a maximum Doppler frequency associated with the channel model. For example, a coherence time associated with EVA-70 may be a function of 1/70 hertz or around 14.28 ms and an associated BLER period for this model may be 15 ms. In another example, a coherence time associated with EPA-5 may be a function of 1/5 hertz or around 200 ms and an associated BLER period for this model may be 200 ms.

In some embodiments, a BLER may indicate a portion of NACKs out of all data receipt feedback messages sent. For example, a 10% BLER may indicate that ten NACKs for every ninety ACKs should be sent to DUT 102. In some embodiments, temporal placement may be determined using a time variance function. For example, a time variance function may receive a BLER value (e.g., from selector 112). The time variance function may include one or more algorithms (e.g., a round-robin algorithm, a randomization algorithm, or other scheme) for determining temporal placement of ACKs and NACKs such that the BLER value is expressed accurately and/or realistically.

Figure 3A:
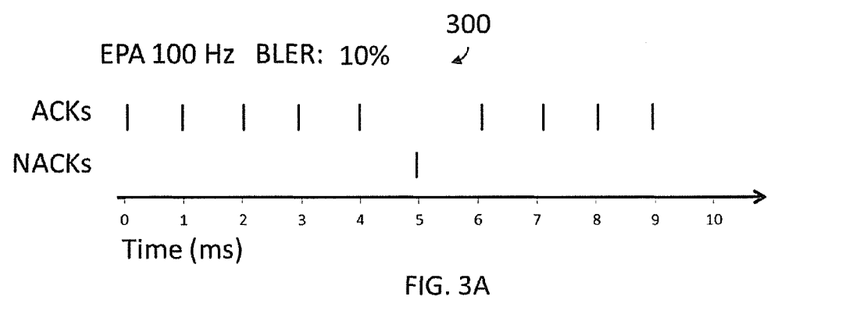
FIGS. 3A-3F are diagrams illustrating time variance associated with a system level metric according to an embodiment of the subject matter described herein.
Figure 3B:
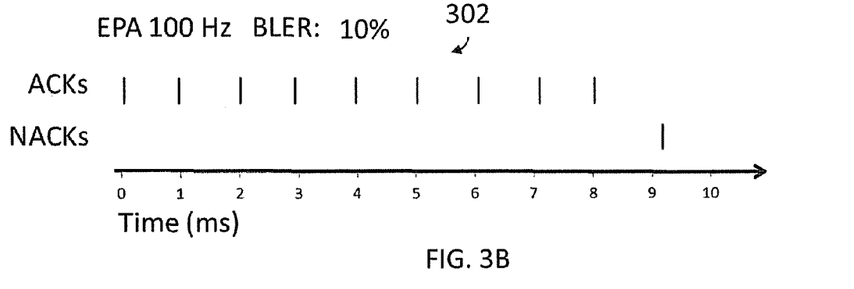
Figure 3C:
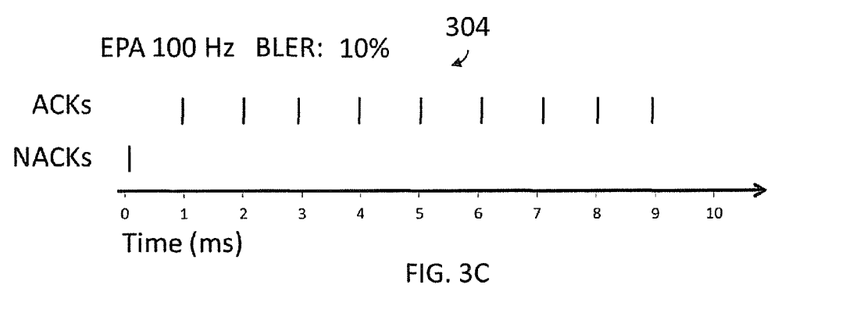

In FIGS. 3A-3C, diagrams 300-304 depict various temporal placements of ACKs and NACKs associated with a 10% BLER and an EPA-100 channel model. In these diagrams, the BLER period for the EPA-100 channel model may be 1/100 hertz or 10 ms. The feedback messages may be sent 1 per ms and may be represented as tally marks. Diagram 300 depicts five consecutive ACKs, one NACK, and four subsequent ACKs occurring within a period of 10 ms. Diagram 302 depicts nine consecutive ACKs and one subsequent NACK occurring within a period of 10 ms. Diagram 304 depicts one NACK and nine subsequent ACKs occurring within a period of 10 ms.

Figure 3D:
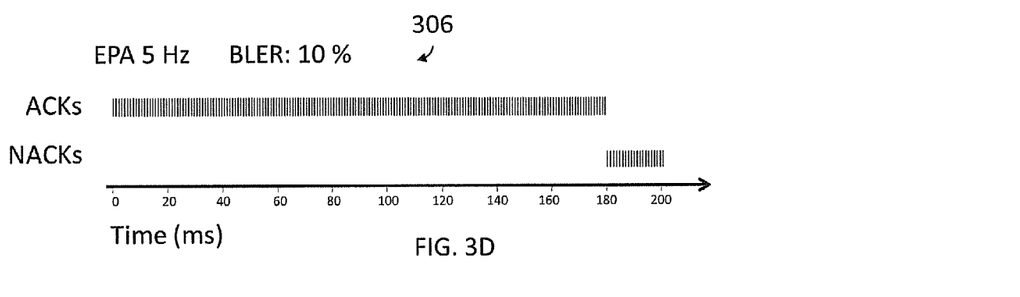
Figure 3E:
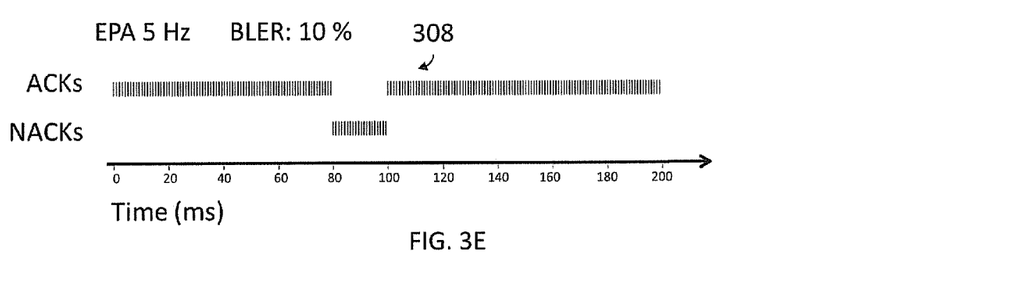
Figure 3F:
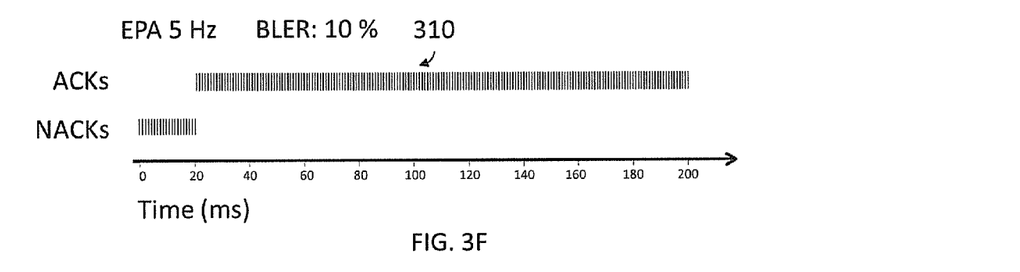

In FIGS. 3D-3F, diagrams 306-310 depict various temporal placements of ACKs and NACKs associated with a 10% BLER and an EPA-5 channel model. In these diagrams, the BLER period for the EPA-5 channel model may be 1/5 hertz or 200 ms. The feedback messages may be sent 1 per ms and may be represented as tally marks. Diagram 306 depicts 180 consecutive ACKs and 20 subsequent NACKs occurring within a period of 200 ms. Diagram 308 depicts 80 consecutive ACKs, 20 NACKs, and 100 subsequent ACKs occurring within a period of 200 ms. Diagram 310 depicts 20 NACKs and 180 subsequent ACKs occurring within a period of 200 ms.

It will be appreciated that diagrams 300-310 are for illustrative purposes and that temporal placements and/or periods associated with BLER or other system level metrics may vary. For example, various other temporal arrangements for NACKs and ACKs may be expressed and various channel model may have different associated periods.

Figure 4:
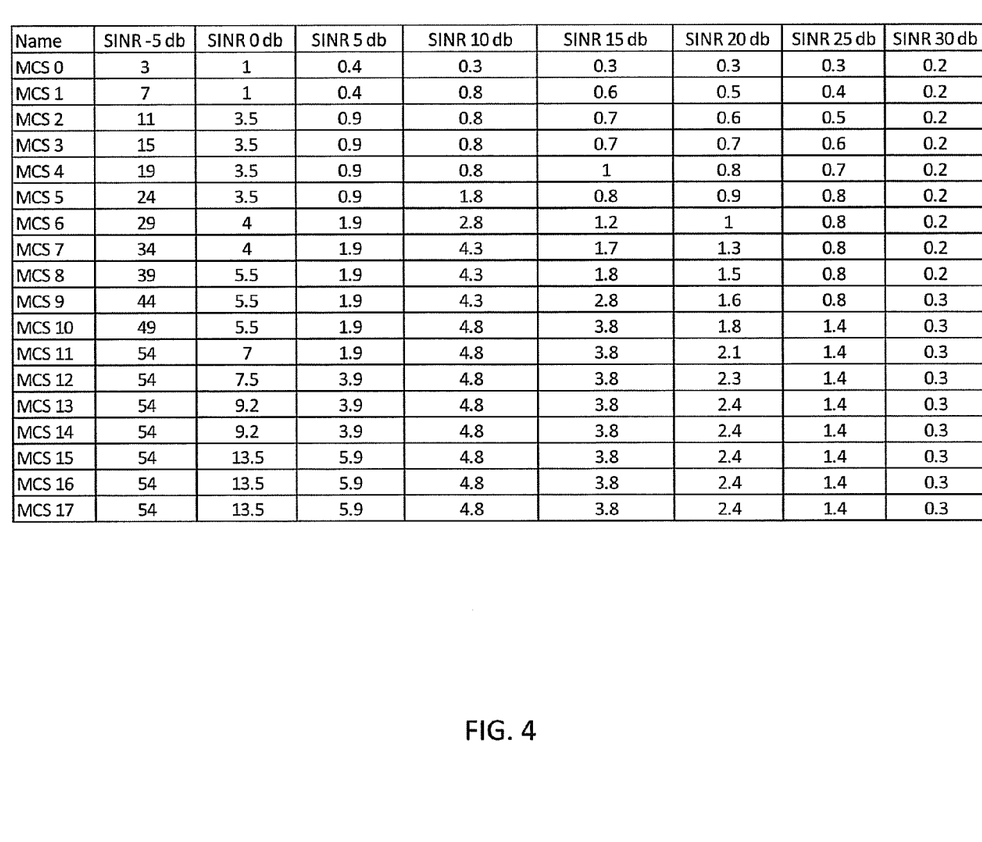
FIG. 4 is a diagram illustrating exemplary system level metric data according to an embodiment of the subject matter described herein.

FIG. 4 is a diagram illustrating exemplary system level metric data according to an embodiment of the subject matter described herein. In some embodiments, numerous data structures containing system level metrics may be maintained in memory 110, e.g., a data structure for each channel type configuration or channel model.

In FIG. 4, exemplary BLER values associated with EPA-5 channel model and multiple input multiple output (MIMO) correlation of 2×2 medium may be depicted. Exemplary BLER values may be indexed by or identified using SINR values and MCS values. For example, a 0.3 (e.g., 0.3%) BLER value may be indexed by MCS 0 and SINR 10 decibels (db). In another example, a 1.8 (e.g., 1.8%) BLER value may be indexed by MCS 8 and SINR 15 db. In yet another example, a 2.4 (e.g., 2.4%) BLER value may be indexed by MCS 16 and SINR 20 db.

In some embodiments, selector 112 or another module may use stored system level metrics when generating simulated system level metrics. For example, using exemplary data in FIG. 4, selector 112 may identify a BLER value using channel condition metrics, such as an MCS value and an SINR value. In this example, an MCS value may range from 0-28 and may determine current throughput of downlink data for a UE and an SINR value may indicate a signal to interference plus noise ratio value. After identifying a relevant value, selector 112 or another module may use or modify the value to generate a simulated system level metric. For example, selector 112 may input retrieved data into a variance function to determine a BLER. In this example, CCS module 108, selector 112, or uplink processing module 118 may generate NACKs and ACKs based on the determined BLER.

As stated above, precomputed system level metrics may be modified or entered by a test operator or other user. For example, exemplary data of FIG. 4 may be presented to a user via a GUI. In this example, the user may be able to modify, change, or add BLER values and/or indexing information associated with BLER values. For example, a test operator may add a column of BLER values for SINR 12 db, adjust BLER values associated MCS 1, and/or add a row of BLER values for MCS 18.

It will be appreciated that FIG. 4 is for illustrative purposes and that system level metric data may vary and/or may be include additional and/or different indexing information.

Figure 5:
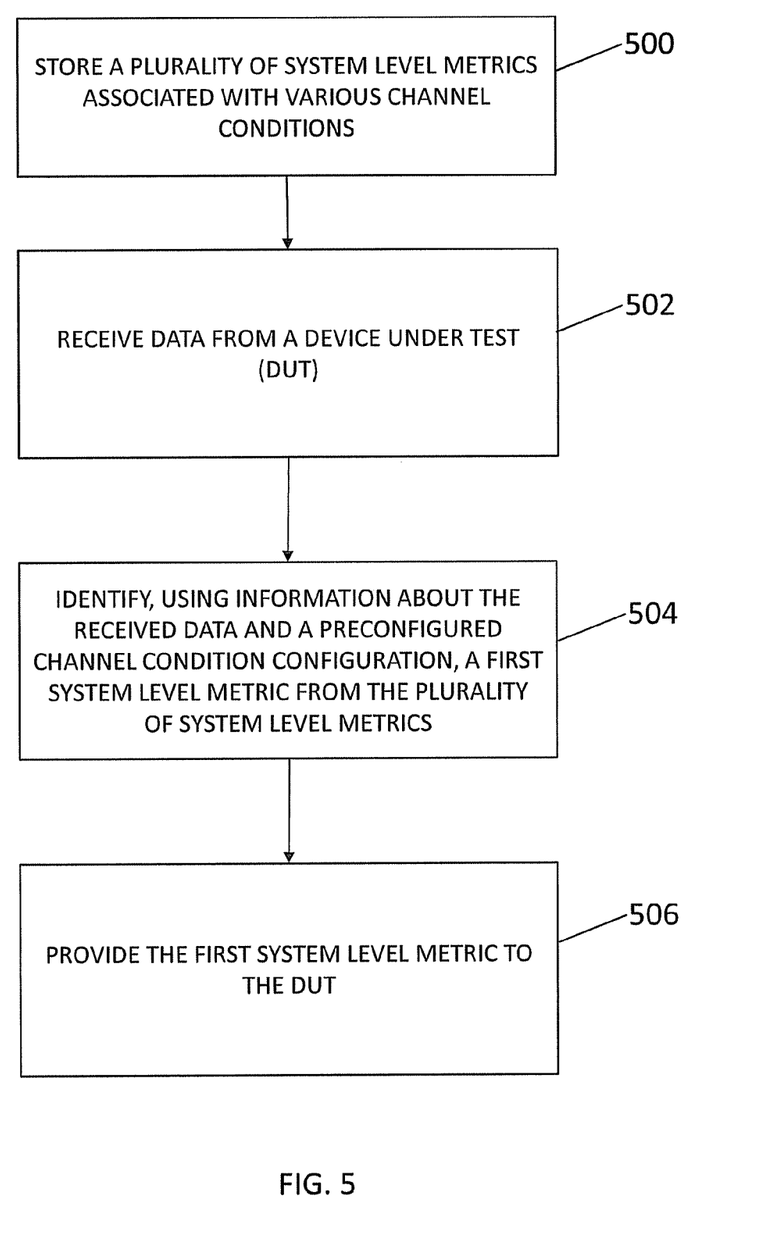
FIG. 5 is a diagram illustrating an exemplary process for simulating channel conditions according to an embodiment of the subject matter described herein.

FIG. 5 is a diagram illustrating an exemplary process for simulating channel conditions according to an embodiment of the subject matter described herein. In some embodiments, the exemplary process described herein, or portions thereof, may be performed by multi-UE simulator 104, CCS module 108, selector 112, and/or another module or node.

In step 500, a plurality of system level metrics may be precomputed and stored in memory. For example, CCS module 108 may be configured to generate the plurality of system level metrics based on one or more physical layer simulations. The physical layer simulations may be based on various channel models, such as an additive white Gaussian noise (AWGN) model, an extended pedestrian A (EPA) model, an extended vehicular A (EVU) model, an extended typical urban (ETU) model, an extended pedestrian A five hertz (EPA-5) model, an extended vehicular A five hertz (EVA-5) model, an extended vehicular A seventy hertz (EVA-70) model, a high-speed train (HST) model, an extended typical urban seventy hertz (ETU-70) model, and/or an extended typical urban three hundred hertz (ETU-300) model. 3GPP Technical Specifications 36.101 and 36.104, hereinafter respectively referred to as "TS 36.101" and "TS 36.104", define aspects of channel models; the disclosures of which are incorporated by reference herein in their entireties.

In some embodiments, the one or more physical layer simulations used in generating the system level metrics may be performed prior to the test period and each of the one or more physical layer simulations are based on one or more channel models. For example, a physical layer simulation may be performed for each channel model supported by DUT 102. In this example, system level metrics or degradation metrics may be computed for each channel model or simulation. These system level metrics may be stored and indexed or otherwise accessible via one or more inputs, such as channel conditions and channel type configurations.

In some embodiments, storing the plurality of system level metrics associated with various channel conditions may include generating statistical properties associated with the plurality of system level metrics and storing the statistical properties in memory 110, such as storage 116.

In some embodiments, the statistical properties include a mean, a variance, a standard deviation, a minimum value, or a maximum value. The statistical properties may be used (e.g., by a randomization or variance function) to alter or modify precomputed system level metrics.

In some embodiments, each of the plurality of user devices or simulated user devices is associated with a precomputed channel type configuration. For example, a UE 'a' may be associated with an AWGN channel model, a UE 'b' may be associated with an EPA-5 channel model, a UE 'c' may be associated with an EVA-70 channel model.

In step 502, data from DUT 102 may be received. For example, DUT 102 may send a radio subframe, or a portion thereof, to multi-UE simulator 104. Downlink processing module 106 may receive the radio subframe or the portion thereof, and process the radio subframe and may generate, compute, or determine one or more channel condition metrics and/or downlink channel properties. For example, downlink processing module 106 may determine a MCS, an SNR, an SINR, or an energy per bit to thermal noise ratio that is associated with a simulated UE. The one or more channel condition metrics may also be associated with a time component. Downlink processing module 106 may provide the one or more channel condition metrics and/or other information to CCS module 108 or selector 112.

In some embodiments, DUT 102 may include an evolved Node B, a Node B, an evolved packet core (EPC) network, an EPC network node, or a base transceiver station (BTS).

In step 504, a first system level metric from the plurality of system level metric may be identified using information about the received data and a precomputed channel type configuration (e.g., a channel type or related channel model). For example, a simulated UE 'x' may be associated with an SNR value of 5 as indicated by downlink processing module 106. CCS module 108 or selector 112 may determine channel configuration data associated with UE 'x' by accessing CTCD storage 114. In this example, associated channel type configuration data may include an AWGN channel type or model. Using the SNR value and the channel type, selector 112 may query storage 116 for a first system level metric.

In some embodiments, the first system level metric may be an uplink parameter, a CQI, a BLER, a PMI, a RI, an RXLev, or an RXQual.

In some embodiments, identifying the first system level metric from the plurality of system level metrics may include retrieving, based on the information about the received data and the precomputed channel type configuration, the first system level metric from the plurality of system level metrics and performing a bounded randomization function on the first system level metric using statistical properties associated with the first system level metric.

In some embodiments, performing the bounded randomization function may include modifying the first system level metric to a value within a range using a standard deviation, a variance, or a minimum value and a maximum value. For example, selector 112 may obtain statistics associated with a first system level metric retrieved from storage 116. The first system level metric may be a CQI and may represent a mean or average CQI for associated inputs (e.g., an SNR value and a channel type). For example, an AWGN channel model and an SNR value of 5 may be used to retrieve a CQI of 5. Selector 112 may use the statistics to randomly or pseudo-randomly generate a modified CQI between 3 and 7, such as a CQI of 6.

In some embodiments, a bounded randomization function may be performed on-the-fly or at run-time. In some embodiments, a bounded randomization function may be performed by retrieving precomputed values, e.g., that appear random, from storage 116. For example, the pseudo-random values may be stored in a long or large table.

In step 506, the first system level metric may be provided to DUT 102. In some embodiments, providing the first system level metric to DUT 102 may include providing negative acknowledgements (NACKs) in correlation with a block error rate for an appropriate period.

In some embodiments, providing the first system level metric to DUT 102 may include providing the first system level metric as an uplink parameter in an uplink data frame to DUT 102. For example, uplink processing module 118 may generate one or more uplink data frames that include precomputed and/or modified system level metrics for multiple simulated UEs. The system level metrics may approximate real world feedback for UEs experiencing various channel conditions. Using the system level metrics received, DUT 102 may modify or alter subsequent downlink data.

In some embodiments, the exemplary process, or portions thereof, may be performed multiple times. For example, steps 202, 204, and/or 206 may be performed for each of a plurality of user devices or simulated user devices by multi-UE simulator 104.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for simulating channel conditions, the method comprising:
storing a plurality of system level metrics associated with various channel conditions;
receiving data from a device under test (DUT);
for each of a plurality of user devices or simulated user devices during a test period:
identifying, using information about the received data and a precomputed channel type configuration, a first system level metric from the plurality of system level metrics; and
providing the first system level metric to the DUT,
wherein identifying the first system level metric from the plurality of system level metrics includes retrieving, based on the information about the received data and the precomputed channel type configuration, the first system level metric from the plurality of system level metrics and performing a bounded randomization function on the first system level metric using statistical properties associated with the first system level metric.

2. The method of claim 1 wherein storing the plurality of system level metrics associated with various channel conditions includes generating the plurality of system level metrics based on one or more physical layer simulations.

3. The method of claim 2 wherein the one or more physical layer simulations are performed prior to the test period and wherein each of the one or more physical layer simulations are based on one or more channel models.

4. The method of claim 1 wherein storing the plurality of system level metrics associated with various channel conditions includes generating the statistical properties associated with the plurality of system level metrics and storing the statistical properties in a memory.

5. The method of claim 1 wherein the statistical properties include a mean, a variance, a standard deviation, a minimum value, or a maximum value.

6. The method of claim 1 wherein performing the bounded randomization function includes modifying the first system level metric to a value within a range using a standard deviation, a variance value, or a minimum value and a maximum value.

7. The method of claim 1 wherein the first system level metric includes an uplink parameter, a channel quality indicator (CQI), a block error rate, a pre-coding matrix indicator (PMI), a rank indicator (RI), a downlink or receive signal strength (RxLev), or a downlink or receive signal quality (RxQual).

8. The method of claim 1 wherein each of the plurality of user devices or simulated user devices is associated with a precomputed channel type configuration, wherein at least two user devices of the plurality of user devices or simulated user devices are associated with different precomputed channel type configurations.

9. The method of claim 1 wherein the precomputed channel type configuration includes an additive white Gaussian noise (AWGN) model, an extended pedestrian A (EPA) model, an extended vehicular A (EVU) model, an extended typical urban (ETU) model, an extended pedestrian A five hertz (EPA-5) model, an extended vehicular A five hertz (EVA-5) model, an extended vehicular A seventy hertz (EVA-70) model, a high-speed train (HST) model, an extended typical urban seventy hertz (ETU-70) model, or an extended typical urban three hundred hertz (ETU-300) model.

10. The method of claim 1 wherein the DUT includes an evolved Node B, a Node B, an evolved packet core (EPC) network, an EPC network node, or a base transceiver station (BTS).

11. The method of claim 1 wherein the information about the received data includes a channel condition metric, a modulation and coding scheme (MCS) value, a downlink channel property, a signal to noise ratio (SNR), a signal to interference-noise ratio (SINR), or an energy per bit to thermal noise ratio.

12. The method of claim 1 wherein the first system level metric is a block error rate and wherein providing the first system level metric to the DUT includes providing negative acknowledgements (NACKs) in correlation with the block error rate for an appropriate period.

13. The method of claim 1 wherein providing the first system level metric to the DUT includes providing the first system level metric as an uplink parameter in an uplink data frame to the DUT.

14. A system for simulating channel conditions, the system comprising:
a memory configurable for storing a plurality of system level metrics associated with various channel conditions;
a communications interface configured to receive data from a device under test (DUT); and
a channel condition simulator (CCS) module embodied in a non-transitory computer readable medium configured to for each of a plurality of user devices or simulated user devices during a test period:
identify, using information about the received data and a precomputed channel type configuration, a first system level metric from the plurality of system level metrics, and
provide the first system level metric to the DUT,
wherein the CCS module is configured to identify the first system level metric from the plurality of system level metrics by retrieving, based on the information about the received data and the precomputed channel type configuration, the first system level metric from the plurality of system level metrics and performing a bounded randomization function on the first system level metric using statistical properties associated with the first system level metric.

15. The system of claim 14 wherein the CCS module is configured to generate the plurality of system level metrics based on one or more physical layer simulations and to store the plurality of system level metrics in the memory.

16. The system of claim 15 wherein the one or more physical layer simulations are performed prior to the test period and wherein each of the one or more physical layer simulations are based on one or more channel models.

17. The system of claim 14 wherein the CCS module is configured to generate the statistical properties associated with the plurality of system level metrics and to store the statistical properties in the memory.

18. The system of claim 14 wherein the statistical properties include a mean, a variance, a standard deviation, a minimum value, or a maximum value.

19. The system of claim 14 wherein the CCS module is configured to perform the bounded randomization function by modifying the first system level metric to a value within a range using a standard deviation, a variance value, or a minimum value and a maximum value.

20. The system of claim 14 wherein the first system level metric includes an uplink parameter, a channel quality indicator (CQI), a block error rate, a pre-coding matrix indicator (PMI), a rank indicator (RI), a downlink or receive signal strength (RxLev), or a downlink or receive signal quality (RxQual).

21. The system of claim 14 wherein each of the plurality of user devices or simulated user devices is associated with a precomputed channel type configuration, wherein at least two user devices of the plurality of user devices or simulated user devices are associated with different precomputed channel type configuration.

22. The system of claim 14 wherein the precomputed channel type configuration includes an additive white Gaussian noise (AWGN) model, an extended pedestrian A (EPA) model, an extended vehicular A (EVU) model, an extended typical urban (ETU) model, an extended pedestrian A five hertz (EPA-5) model, an extended vehicular A five hertz (EVA-5) model, an extended vehicular A seventy hertz (EVA-70) model, a high-speed train (HST) model, an extended typical urban seventy hertz (ETU-70) model, or an extended typical urban three hundred hertz (ETU-300) model.

23. The system of claim 14 wherein the DUT includes an evolved Node B, a Node B, an evolved packet core (EPC) network, an EPC network node, or a base transceiver station (BTS).

24. The system of claim 14 wherein the information about the received data includes a channel condition metric, a downlink channel property, a modulation and coding scheme (MCS) value, a signal to noise ratio (SNR), a signal to interference-noise ratio (SINR), or an energy per bit to thermal noise ratio.

25. The system of claim 14 wherein the first system level metric is a block error rate and wherein the system is configured to provide the first system level metric to the DUT by providing negative acknowledgements (NACKs) in correlation with the block error rate for an appropriate period.

26. The system of claim 14 wherein the system is configured to provide the first system level metric to the DUT by providing the first system level metric as an uplink parameter in an uplink data frame to the DUT.

27. A non-transitory computer readable medium comprising computer executable instructions embodied thereon that when executed by a processor of a computer control the computer to perform steps comprising:
storing a plurality of system level metrics associated with various channel conditions;
receiving data from a device under test (DUT);
for each of a plurality of user devices or simulated user devices during a test period:
identifying, using information about the received data and a precomputed channel type configuration, a first system level metric from the plurality of system level metrics; and
providing the first system level metric to the DUT,
wherein identifying the first system level metric from the plurality of system level metrics includes retrieving, based on the information about the received data and the precomputed channel type configuration, the first system level metric from the plurality of system level metrics and performing a bounded randomization function on the first system level metric using statistical properties associated with the first system level metric.

* * * * *